United States Patent [19]

Ota

[11] Patent Number: 4,466,022
[45] Date of Patent: Aug. 14, 1984

[54] COLOR VIDEO SIGNAL REPRODUCING APPARATUS WHICH TRANSFORMS THE RECORDED SIGNAL OF ONE SIGNAL FORMAT INTO SIGNALS OF ANOTHER FORMAT UPON REPRODUCTION

[75] Inventor: Yoshihiko Ota, Yokohama, Japan

[73] Assignee: Victor Company of Japan, Ltd., Yokohama, Japan

[21] Appl. No.: 299,348

[22] Filed: Sep. 4, 1981

[30] Foreign Application Priority Data

Sep. 5, 1980 [JP] Japan .............................. 55-123349

[51] Int. Cl.³ ....................... H04N 9/491; H04N 9/42
[52] U.S. Cl. ...................................... 358/330; 358/11
[58] Field of Search ................ 358/11, 310, 329, 330, 358/316

[56] References Cited

U.S. PATENT DOCUMENTS

| | | | |
|---|---|---|---|
| 3,917,415 | 11/1975 | Eguchi | 358/11 X |
| 3,968,514 | 7/1976 | Narahara et al. | 358/310 X |
| 4,136,358 | 1/1979 | Clemens et al. | 358/329 X |
| 4,200,881 | 4/1980 | Carnt et al. | 358/329 X |
| 4,217,603 | 8/1980 | Hjortzberg | 358/310 X |
| 4,346,397 | 8/1982 | Ota | 358/11 X |

FOREIGN PATENT DOCUMENTS

2304940 7/1976 Fed. Rep. of Germany .

Primary Examiner—Aristotelis M. Psitos
Attorney, Agent, or Firm—Louis Bernat

[57] ABSTRACT

A color video signal reproducing apparatus comprises a reproducing circuit for picking up and reproducing a recorded signal from a recording medium in which a carrier chrominance signal and a color burst signal within a PAL system color video signal are converted into low frequencies and recorded together with a luminance signal, a frequency converting circuit for respectively frequency converting a reproduced carrier chrominance signal and a reproduced color burst signal converted into a low frequency region and obtained from the reproducing circuit into a chrominance subcarrier frequency of an NTSC system, a gate circuit for passing signals other than a carrier chrominance signal within a horizontal scanning period in which a color difference signal (R-Y) of the carrier chrominance signal and the color burst signal obtained from the frequency converting circuit is inverted, a supplementing circuit for delaying a carrier chrominance signal of one horizontal scanning period before a horizontal scanning period from which a carrier chrominance signal within an output signal of the gate circuit is eliminated, and supplementing the delayed carrier chrominance signal into the horizontal scanning period from which the carrier chrominance signal within the output signal of the gate circuit, and a color burst signal composing circuit for respectively composing color burst signals of adjacent one horizontal scanning periods of a color burst signal within the output signal of the gate circuit, and obtaining a color burst signal having an intermediate phase between the phases of the color burst signals.

3 Claims, 8 Drawing Figures

COLOR VIDEO SIGNAL REPRODUCING APPARATUS WHICH TRANSFORMS THE RECORDED SIGNAL OF ONE SIGNAL FORMAT INTO SIGNALS OF ANOTHER FORMAT UPON REPRODUCTION

BACKGROUND OF THE INVENTION

The present invention generally relates to color video signal reproducing apparatuses, and more particularly to a color video signal reproducing apparatus capable of performing reproduction by converting the system of a PAL system color video signal to an artificial NTSC system color video signal.

Presently, the television system is not unified worldwide, and apparatuses for recording and reproducing a video signal is matched to the television system of that particular region. Hence, in principle, recording and reproduction of a video signal of another region which is of a different television system, cannot be performed. Moreover, television receivers generally sold are similarly made exclusively for a particular television system.

Therefore, in a case where a recording medium which is to be reproduced by a video signal recording and reproducing apparatus is recorded in a region where the television system is different from that of the above video signal recording and reproducing apparatus, a reproduced picture cannot be obtained in the general color television receiver just by simply reproducing the recorded video signal as it is. Accordingly, in order to obtain the reproduced picture in the above case, a so-called system conversion of signal must be performed to convert the television system of the recorded signal to the television system of the above video signal recording and reproducing apparatus.

Various types of systems for converting signals have been proposed conventionally recently, a conversion apparatus has been developed and reduced to practical use in broadcasting stations which mainly comprises a frame memory using digital memory elements of large memory capacity. However, the above conversion apparatus is expensive and the scale of the apparatus is too large for general use. Accordingly, in a video signal recording and reproducing apparatus for home use, there are no simple effective means for obtaining a reproduced picture from a recording medium recorded with a video signal of a television system different from that of the video signal recording and reproducing apparatus. Therefore, a color television receiver and a video signal recording and reproducing apparatus exclusively for the signal of the above particular television system, must be separately prepared. Since the apparatus were required in duplicate, the cost of the system as a whole became high, and it was a waste in that two apparatuses were required to reproduce signals of two different television systems.

SUMMARY OF THE INVENTION

Accordingly, it is a general object of the present invention to provide a novel and useful color video signal reproducing apparatus in which the above described disadvantages have been overcome.

Another and more specific object of the present invention is to provide a color video signal reproducing apparatus capable of reproducing a PAL system color video signal as the artificial NTSC system color video signal, so that a recording medium recorded with the PAL system color video signal whose carrier chrominance signal is frequency converted into a low frequency range and recorded together with a luminance signal, can be reproduced by an NTSC system color television receiver.

Still another object of the present invention is to provide a color video signal reproducing apparatus capable of reproducing a recording medium recorded with a PAL system color video signal to reproduce the PAL system color video signal as the artificial NTSC system color video signal, even in a recording and reproducing apparatus made for recording and reproducing an NTSC system color video signal.

Other objects and further features of the present invention will be apparent from the following detailed description when read in conjunction with the accompanying drawings.

DETAILED DESCRIPTION

In order to simplify the description of the color video signal reproducing apparatus according to the present invention, as an example, a description will be given with respect to a helical scanning type video tape recorder (VTR) which forms video tracks on a magnetic tape within a cassette without guard bands by use of a pair of rotary heads having gaps of mutually different azimuth angles.

In the above described VTR, the rotary head drum part and other essential mechanism parts are respectively of the same design in most cases for the PAL system and the NTSC system. Moreover, the above VTR uses a tape cassette of a common shape and characteristic for the PAL and NTSC systems. Accordingly, there are cases where the apparatus is designed to obtain a mechanism which matches the above systems, by varying electrical conditions such as the tape travelling speed, the rotational speed of the rotary head, and the method of signal processing. In this case, the magnetic tape recorded with the PAL system VTR can be reproduced by use of a NTSC system VTR and the NTSC system television receiver, when the following conditions are satisfied.

(1) The tape travelling speed upon reproduction must be set equal to that in the PAL system VTR.

(2) The rotational speed of the rotary head drum of the NTSC system VTR must be set to twenty-five rps which is equal to that of the PAL system VTR.

(3) The chrominance sub-carrier frequency of the reproduced carrier chrominance signal must be set to 3.58 MHz which is equal to that of the NTSC system.

(4) The spectrum alternation signal every one horizontal scanning period 1H (H indicates one horizontal scanning period) which is characteristic of the PAL system color video signal is corrected to a signal having no spectrum alternation as in the NTSC system color video signal.

(5) The variation in phase is eliminated since the phase of the color burst signal of the PAL system alternately varies the phase by plus or minus forty-five degrees every 1H, as compared to the color burst signal of the NTSC system.

The apparatus according to the present invention satisfies the above conditions, and description will hereinafter be given with respect to each of the above conditions.

Figure 1:
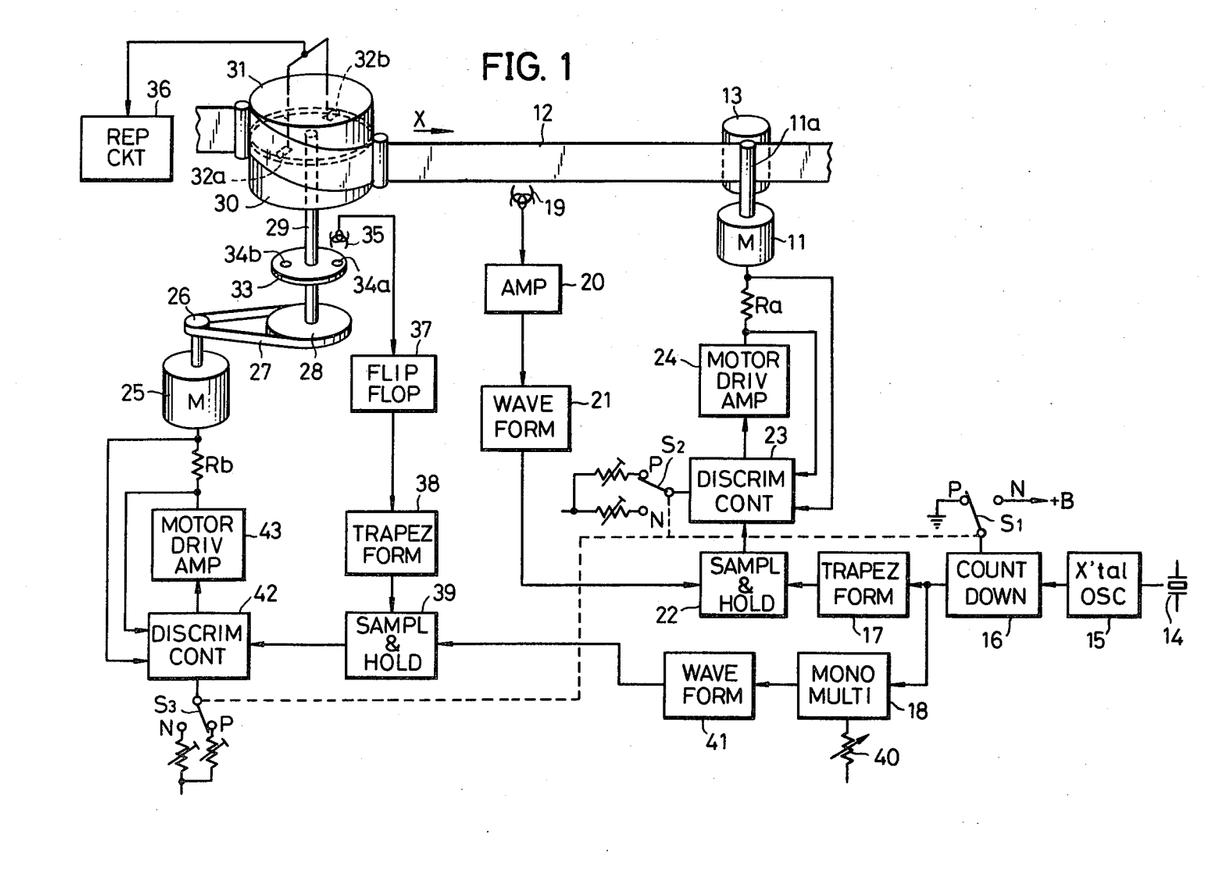
FIG. 1 is a systematic block diagram showing a capstan motor and a drum motor of an embodiment of a color video signal reproducing apparatus according to the present invention.

First, a description will be given with respect to a servo system for a capstan motor and a drum motor, for satisfying the conditions (1) and (2) of the above conditions, with reference to FIG. 1. In FIG. 1, a capstan motor 11 rotates a capstan shaft 11a which is the rotary shaft of the capstan motor 11. The peripheral side surface of the rotating capstan shaft 11a pinches a magnetic tape 12 between a pinch roller 13, and moves the magnetic tape 12 in a direction indicated by an arrow X by pressing against the pinch roller 13 while the capstan shaft 11a rotates.

A capstan servo system controls the rotation of the above capstan motor 11. A crystal oscillator 15 having a crystal vibrator 14 produces a signal having a frequency of 32,768 Hz, for example. The above oscillation output signal of the crystal oscillator 15 is supplied as a common reference signal to the capstan servo system and a drum servo system which will be described hereinafter, and then supplied to a count down circuit 16. The count down circuit 16 is constructed to changeover the frequency dividing ratio according to a signal from a changeover switch S1.

When a magnetic tape recorded with an NTSC system color video signal is reproduced, the changeover switch S1 is connected to the side of a contact point N and applied with a high-level signal. Hence, the signal is frequency divided by 1/1,093 to produce a signal having a frequency of 29.97 Hz. On the other hand, when a magnetic tape recorded with a PAL system color video signal is reproduced, the changeover switch S1 is connected to the side of a contact point P and applied with a low-level signal. Hence, in this case, the signal is frequency divided by 1/1,311 to produce a signal having a frequency of 24.99 Hz. An output signal of the count down circuit 16 is supplied to a trapezoidal wave forming circuit 17 of the capstan servo system as a reference signal, and also supplied to a monostable multivibrator 18 of the drum servo system as a reference signal.

The capstan servo system supplies a control signal reproduced from a control track recorded and formed at an edge portion along the longitudinal direction of the magnetic tape 12, by use of a control head 19, to an amplifier 20. The amplified control signal from the amplifier 20 is supplied to a wave forming circuit 21 which supplies a sampling pulse to a sample-and-hold circuit 22. The sample-and-hold circuit 22 samples and holds the sloping part of the trapezoidal wave obtained from the trapezoidal wave forming circuit 17. Therefore, an error voltage obtained as a result of the above sampling and holding operation is supplied to a discrimination control circuit 23 wherein the error voltage is differentially amplified with a voltage between both terminals of a resistor Ra connected at the output end of a motor driving amplifier 24. Hence an output voltage of the discrimination control circuit 23 is applied to the capstan motor 11 through the motor driving amplifier 24 and the resistor Ra. Accordingly, the capstan motor 11 is rotated at a constant rotational speed in synchronism with the reference signal.

When the magnetic tape recorded with the NTSC system color video signal by the NTSC system VTR is reproduced, a changeover switch S2 is connected to the side of a contact point N, and the discrimination control circuit 23 is applied with a predetermined D.C. voltage. On the other hand, when the magnetic tape recorded with the PAL system color video signal by the PAL system VTR is reproduced, the changeover switch S2 is connected to the side of a contact point P, and a D.C. voltage having a level different from the above predetermined D.C. voltage is applied to the discrimination control circuit 23. Accordingly, the center value of the voltage applied to the capstan motor 11 varies according to the changeover position of the changeover switch S2, and the constant rotational speed of the capstan motor 11 is varied according to the changeover of the changeover switch S2. When the magnetic tape recorded with the NTSC system color video signal is reproduced, for example, the rotational speed of the capstan motor 11 is set so that the tape travelling speed becomes 33.4 milli-meters per second. On the other hand, when the magnetic tape recorded with the PAL system color video signal is reproduced, the rotational speed of the capstan motor 11 is controlled so that the tape travelling speed becomes 23.4 milli-meters per second which is equal to that in the PAL system VTR in order to satisfy the above condition (1).

Next, description will be given with respect to the drum servo system. A drum motor 25 has a rotary shaft unitarily provided with a pulley 26 at the tip end thereof, on the same axis as the rotary shaft of the drum motor 25. Accordingly, the rotational force of the drum motor 25 is transmitted to a flywheel 28 through a belt 27. One end of a shaft 29 is fixed to the center part of the flywheel 28, and the other end of the shaft 29 passes through the center part of a fixed drum 30 and is fixed to the center part of a rotary drum 31. A pair of rotary heads 32a and 32b having mutually different azimuth angles, are provided opposing each other along the diametrical direction of the rotary drum 31. The color video signal reproduced from the video track of the magnetic tape 12 by the rotary heads 32a and 32b, is supplied to a reproducing circuit 36.

The above reproducing circuit 36 comprises a circuit shown in FIG. 3 which will be described hereinafter, a demodulating circuit for demodulating the frequency modulated luminance signal within the reproduced color video signal. Moreover, a pair of magnets 34a and 34b of opposite polarities, are mounted on a rotary plate 33 which is unitarily mounted on the same axis as the shaft 29 at a part in the vicinity of the center part of the shaft 29.

Hence, the pair of magnets 34a and 34b provided on the rotary plate 33 which rotates unitarily with the rotary drum 31 due to the rotation of the drum motor 25, alternately pass through a position opposing a gap surface of a pickup head 35. Therefore, a positive polarity pulse and a negative polarity pulse are alternately produced by the pickup head with a repetition frequency which is according to the rotation of the drum motor 25, and supplied to a flip-flop 37. The flip-flop 37 produces a high-level square wave during the period in which the rotary head 32a is scanning over the magnetic tape 12, and produces a low-level signal during the period in which the rotary 32b is scanning over the magnetic tape 12, for example. The above square wave is supplied to a trapezoidal wave forming circuit 38 wherein the square wave is converted into a trapezoidal wave, and then supplied to a sample-and-hold circuit 39 as a comparison signal.

On the other hand, the reference signal obtained from the count down circuit 16 is delayed by a predetermined time at the monostable multivibrator 18. The above delay quantity is variably adjusted by a variable resistor 40, so that the rotary heads 32a and 32b scan the best point of the video track which is formed in an oblique manner with respect to the longitudinal direction of the magnetic tape 12. The output pulse of the monostable multivibrator 18 is supplied to a wave forming circuit 41 wherein the pulse is converted into a narrow sampling pulse. The above narrow sampling pulse is supplied to the sample-and-hold circuit 39 wherein the sloping part of the trapezoidal wave obtained from the trapezoidal wave forming circuit 38 is sampled and held.

Accordingly, a voltage according to the phase error with respect to the reference signal of the rotary heads 32a and 32b and the rotary drum 31, is obtained from the sample-and-hold circuit 39 and then supplied to a discrimination control circuit 42. The voltage supplied to the discrimination control circuit 42 is differentially amplified with a voltage obtained from both terminals of a resistor Rb. Moreover, the output of the discrimination control circuit 42 is applied to the drum motor 25 through a motor driving amplifier 43 and the resistor Rb, to control the rotation of the drum motor 25. Due to the operation of the above drum servo system, the rotational phase of the rotary drum 31 and the rotary heads 32a and 32b are synchronized with the reference signal phase. Thus, control can be performed so that the rotary heads scan the best point (center) of the oblique track on the magnetic tape, by varying the phase difference.

Similarly as in the capstan servo system, in a case where the recorded color video signal on the magnetic tape which is reproduced is of the NTSC system, a changeover switch S3 is connected to the side of a contact point N in the drum servo system. Further, in a case where the recorded color video signal on the magnetic tape which is reproduced is of the PAL system, the changeover switch S3 is connected on the side of a contact point P to apply a D.C. voltage having a different value to the discrimination control circuit 42. Hence, the center value of the applied voltage is varied, and the drum motor 25 is rotated at a rotational speed of twenty-five rps which is the same as that for the PAL system VTR, upon reproduction of the magnetic tape recorded with the PAL system color video signal. Therefore, the above condition (2) can be satisfied.

Moreover, the above changeover switches S1 through S3 respectively are changed over and connected in a linked manner. Furthermore, when the changeover switch S3 is connected to the side of the contact point N, the rotary drum 25 is rotated at a rotational speed of thirty rps.

Even in a case where a magnetic tape recorded with the PAL system color video signal is reproduced, reproduction can be performed in a correct tracking state similarly as in the case where the magnetic tape recorded with the NTSC system color video signal is reproduced, by connecting the changeover switches S1 through S3 on the sides of the contact points P. In addition, the changeover between the NTSC system and the PAL system can not only be performed manually, but the changeover can be performed by automatic discrimination using the control signal frequency.

The audio signal and the luminance signal can be reproduced in a normal manner, by reproducing the magnetic tape recorded with the PAL system color video signal in the correct tracking state. However, since the above luminance signal is the luminance signal within the PAL system color video signal, the horizontal scanning frequency and the field frequency respectively are 15.625 kHz and 50 Hz. Accordingly, when the signal is to be observed in the NTSC system color television receiver as it is, there are cases where the vertical synchronization is slightly disturbed. However, this slight disturbance in the vertical synchronization can be corrected by manipulating a vertical synchronization knob. Since the horizontal scanning frequency in the PAL system is almost the same as that in the NTSC system, the horizontal synchronization is maintained.

As a condition for the luminance signal of the PAL system to be normally reproduced by the NTSC system VTR, at least the carrier frequency, deviation, and pre-emphasis characteristic upon frequency modulation of the luminance signal which is recorded after being frequency modulated, must be the same for the two systems. The carrier frequency in the PAL system VTR is higher than that in the NTSC system VTR by approximately 400 kHz, however, the deviation and pre-emphasis characteristic are the same for the two systems. Accordingly, when reproducing the magnetic tape recorded with the PAL system color video signal on the NTSC system VTR, hardly any changeover operation needs to be performed on the reproducing side for the luminance signal. Strictly speaking, however, there is a difference in the frequency modulated (FM) level due to differences in the relative linear velocity between the magnetic tape and the head, and the setting of the resonance frequency of the reproducing rotary heads, and the luminance signal can be reproduced in a more complete manner by correcting the above. It is of course necessary to perform a suitable changeover operation in a case where the PAL system VTR and the NTSC VTR differ greatly in the above described points.

Therefore, the NTSC system VTR can be given a function to obtain the same tape travelling speed and the same rotational speed of the drum as those of the PAL system VTR. However, when the reproduced PAL system color video signal is reproduced on the NTSC system color television receiver in the above described state, no color is obtained in the reproduced picture. This is because there is a great difference between the signal transmission or processing format of the color signal between the NTSC system and the PAL system. In order to reproduce the PAL system color video signal on the NTSC system color television receiver so that the color is normally reproduced, the carrier chrominance signal of the PAL system must be reproduced as a carrier chrominance signal similar to the carrier chrominance signal within the NTSC system color video signal. Hence, the above electrical processing described in the above conditions (3) through (5) become necessary.

Figure 2:
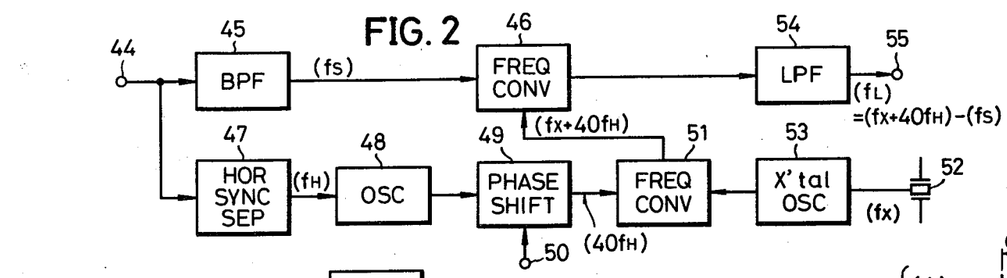
FIG. 2 is a systematic block diagram showing an example of a recording system for a carrier chrominance signal recorded in a recording medium which is to be reproduced by the apparatus according to the present invention.

In the present embodiment of the VTR, the VTR of both the NTSC system and the PAL system reproduce a magnetic tape recorded with a carrier chrominance signal which has passed through a signal processing system such as the block system shown in FIG. 2. Accordingly, description will be given with respect to the recording system of the carrier chrominance signal. However, cross talk from adjacent tracks becomes a problem upon reproduction, since the tracks are formed and recorded in an oblique manner with respect to the longitudinal direction of the magnetic tape without guard bands, by use of rotary heads having mutually different azimuth angles. Means are therefore required for eliminating the above cross talk, however, the means are quite different in the PAL system and the NTSC system.

In FIG. 2, an incoming color video signal to an input terminal 44 which is to be recorded, is supplied to a bandpass filter 45 wherein the carrier chrominance signal and the color burst signal are obtained, and then supplied to a frequency converter 46. On the other hand, the above input color video signal is also supplied to a horizontal synchronization separation circuit 47 wherein the horizontal synchronizing signal is obtained.

An output of the horizontal synchronization separation circuit 47 is supplied to an oscillator 48 wherein the signal is converted into four kinds of signals respectively having phases which are mutually different by forty-five degrees and of a frequency $40f_H$ which is forty times the horizontal scanning frequency $f_H$. These four kinds of signals are simultaneously supplied to a phase shifting circuit 49. In the NTSC system VTR, the phase shifting circuit 49 successively and selectively produces a signal having a frequency of $40f_H$ so that the phase advances by ninety degrees every 1H during the period in which the rotary head 32a for channel 1 (CH1) performs recording, by use of the drum pulse (output of the flip-flop 37 shown in FIG. 1) obtained through an input terminal 50. Moreover, during the period in which the rotary head 32b for channel 2 (CH2) performs recording, the phase shifting circuit 49 successively and selectively produces a signal having a frequency of $40f_H$ so that the phase lags by ninety degrees every 1H. On the other hand, in the PAL system VTR, the carrier chrominance signal within the PAL system color video signal is modulated of the chrominance sub-carrier by a carrier suppression quadrature two-phase modulation by two color difference signals, and the chrominance sub-carrier is reversed of the phase every 1H. Therefore, in the PAL system VTR, the phase shifting circuit 49 does not perform any phase shifting operation during the period in which the rotary head of CH1 is performing recording, and produces a signal having a frequency $40f_H$ only during the period in which the rotary head for CH2 is performing recording so that the phase is successively shifted by ninety degrees every 1H. The above described operation performed by the phase shifting circuit 49 will be referred to as phase rotation hereinafter.

The output signal of the above phase shifting circuit 49 is supplied to a frequency converter 51 wherein the signal is frequency converted with an oscillation frequency $f_x$ supplied from a crystal oscillator 53 having a crystal vibrator 52, to be converted into a signal having a frequency $(f_x + 40f_H)$. The above output signal of the frequency converter 51 is supplied to the frequency converter 46 wherein the signal is frequency converted with the carrier chrominance signal having a chrominance sub-carrier frequency $f_s$ which is supplied from the bandpass filter 45. Accordingly, signals obtained from the frequency converter 46 and eliminated of the unwanted component at lowpass filter 54 to be produced through an output terminal 55, are a color burst signal and a carrier chrominance signal converted into a low frequency range whose chrominance sub-carrier frequency $f_L$ is described by $(f_x + 40f_H - f_s)$. Moreover, the signals are also subjected to the above described phase rotation. The above frequency $f_L$ is set to $40\frac{1}{8}f_H$ in the PAL system VTR, and set to $40f_H$ in the NTSC system VTR. Furthermore, concrete values for each of the above frequencies $f_s$, $f_H$, $f_x$, and $f_L$ are respectively shown in the table below, wherein the frequencies are indicated in kHz.

TABLE

|  | $f_S$ | $f_H$ | $f_x$ | $f_L$ |
| --- | --- | --- | --- | --- |
| NTSC system VTR | 3579.545 | 15.734 | 3579.545 | 629.371 |
| PAL system VTR | 4433.619 | 15.625 | 4435.572 | 626.953 |

The frequency $f_L$ of the carrier chrominance signal which is converted into the low frequency range and recorded on the magnetic tape, is related to the horizontal scanning frequency $f_H$. Accordingly, the above carrier chrominance signal frequency can be restored to the original carrier chrominance signal frequency upon reproduction, by the horizontal synchronizing signal frequency of the reproduced color video signal and the reference signal. During the above restoration, the chrominance sub-carrier frequency $f_s$ is set for the carrier chrominance signal for the NTSC system and the carrier chrominance signal for the PAL system by selecting the frequency of the above reference signal.

Next, description will be given with respect to signal processing of the carrier chrominance signal and the color burst signal in order to satisfy the above conditions (3) through (5), by referring to FIGS. 3 through 8. In FIGS. 3 through 8, those frequencies which are the same as those frequencies in FIG. 2 are designated by like designations. In FIG. 3, a reproduced color video signal is supplied to an input terminal 56. The above reproduced color video signal is a signal reproduced from the video track on the magnetic tape 12. That is, the reproduced color video signal is a frequency division multiplexed signal between the color burst signal and the carrier chrominance signal converted into the low frequency range which are produced through the output terminal 55 shown in FIG. 2, and a frequency modulated luminance signal obtained by frequency modulating a luminance signal separated from within the color video signal of the NTSC system or the PAL system into a frequency band higher than that of the carrier chrominance signal converted into the low frequency range.

Furthermore, a demodulated luminance signal obtained by separating the frequency modulated luminance signal within the reproduced color video signal by a highpass filter (not shown) and then FM demodulating the separated frequency modulated luminance signal at an FM demodulator (not shown), is supplied to an input terminal 59. The reproduced carrier chrominance signal converted into the low frequency range (chrominance sub-carrier frequency $f_L$) and the color burst signal are separated from the reproduced color video signal supplied to the input terminal 56, at a low-pass filter 57, and then supplied to a frequency converter 58. On the other hand, the demodulated luminance signal supplied to the input terminal 59 is supplied to a horizontal synchronization separation circuit 60 wherein only the horizontal synchronizing signal is obtained, and then supplied to an oscillator 61. The above signal thus supplied to the oscillator 61 is converted into a total of four kinds of signals having a frequency of $40f_H$ whose phases are in synchronism with the reproduced horizontal synchronizing signal obtained from the oscillator 61 and mutually differ by a phase angle of ninety degrees. These four kinds of signals from the oscillator 61 are respectively supplied to a phase shifting circuit 62.

The phase shifting circuit 62 performs a phase rotation operation in response to a changeover of a changeover switch S4, by the drum pulse obtained from an input terminal 63 and the above four kinds of signals having a frequency of $40f_H$. For example, the changeover switch S4 is connected to the side of a contact point N when a magnetic tape recorded with the NTSC system color video signal is reproduced, and the phase shifting circuit 62 accordingly performs a phase rotation similar to that performed upon recording in the NTSC system VTR. On the other hand, the changeover switch S4 is connected to the side of a contact point P when a magnetic tape recorded with the PAL system color video signal is reproduced, and the phase shifting circuit 62 accordingly performs a phase rotation similar to that performed upon recording in the PAL system VTR.

The output signal of the phase shifting circuit 62 is supplied to a frequency converter 64 wherein the signal supplied thereto is frequency converted with a signal from a voltage controlled crystal oscillator (hereinafter referred to as a VXO) 71 having a crystal vibrator 70. The center frequency of an oscillation output of the above VXO 71 is indicated by $f_x$. The signal subjected to phase rotation having a frequency of $(f_x + 40f_H)$ which is obtained from the frequency converter 64, is supplied to the frequency converter 58. Hence, a color burst signal and a carrier chrominance signal eliminated of the phase rotation and of the chrominance sub-carrier frequency $f_s$, are obtained from the frequency converter 58. These signals thus obtained, are eliminated of the unwanted components at a bandpass filter 65, and then supplied to a burst gate circuit 66 and a gate circuit 73. The color burst signal separated and obtained at the burst gate circuit 66 is supplied to a phase comparator 67 wherein the phase of the color burst signal is compared with that of an output reference signal having the oscillation frequency $f_s$ obtained from a crystal oscillator 69 having a crystal vibrator 68. An error voltage according to the phase difference obtained as a result of the phase comparison is applied to the VXO 71 as a control voltage, and also simultaneously applied to a gate pulse generator 72 which will be described hereinafter.

The chrominance sub-carrier frequency of the carrier chrominance signal converted into the low frequency region and the frequency $f_L$ of the color burst signal converted into the low frequency region in the PAL system VTR, are higher than those frequencies of the NTSC system VTR by $\frac{1}{8}f_H$, as described above in conjunction with FIG. 2. Therefore, in order to satisfy the above condition (3), when reproducing a magnetic tape recorded with the PAL system VTR on the NTSC system VTR, the center frequency of the VXO 71 must be set higher by an amount of $\frac{1}{8}f_H$ as compared to a case where a magnetic tape recorded with the NTSC system VTR is reproduced. That is, the center frequency of the VXO 71 is set to 3,581.5 kHz when the magnetic tape recorded with the PAL system VTR is reproduced, and set to 3,579.545 kHz when the magnetic tape recorded with the NTSC system VTR is reproduced. However, the above two center frequencies for the VXO 71 only differ by approximately 1.95 kHz, and a frequency difference of this order can be covered by use of a common VXO 71. When a suitable circuit constant is selected, there is no need to perform a changeover operation, and the loop will operate so that the output center frequency of the VXO 71 naturally stabilizes to the above values.

Next, description will be given with respect to a correcting operation of the apparatus according to the present invention, which is performed in order to satisfy the above condition (4). In order to satisfy the above condition (4), that is, to correct the PAL system color video signal into a signal having no spectrum alternation, there are such methods as those described in the following.

(i) After demodulating the PAL system color video signal, the demodulated PAL system color video signal is again modulated (encoded) into a signal format similar to that of the carrier chrominance signal within the NTSC system color video signal.

(ii) When the reproduced carrier chrominance signal having a chrominance sub-carrier frequency of 4.43 MHz is frequency modulated to 3.58 MHz, an operation is performed to reverse the spectrum every 1H.

(iii) When the carrier chrominance signal converted into the low frequency range is frequency converted into a carrier chrominance signal having a frequency of 3.58 MHz, a local signal for conversion is operated in order to reverse the spectrum every 1H.

(iv) The interval in which the spectrum of the PAL system carrier chrominance signal whose chrominance sub-carrier frequency is set to 3.58 MHz is reversed is discarded, and a signal of 1H before that particular point in time is inserted into the above discarded interval.

In the present embodiment of the invention, the above method (iv) is used. The carrier chrominance signal of the PAL system is constructed from a color difference signal (R−Y) whose phase reverses by 180 degrees every 1H and a color difference signal (B−Y) whose phase is not reversed, which are subjected to quadrature two-phase modulation. However, the characteristic and the spectrum of the carrier chrominance signal during the horizontal scanning period in which the (R−Y) signal is subjected to quadrature two-phase modulation with a positive phase with the (B−Y) signal, coincide with those of the carrier chrominance signal of the NTSC system. Accordingly, only the above parts where the characteristic and the spectrum of the carrier chrominance signals coincide is used, and the carrier chrominance signal during the horizontal scanning period in which the (R−Y) signal is reversed is discarded. Moreover, the carrier chrominance signal of 1H before that particular point in time can be used to replace the interval in which the carrier chrominance signal during the horizontal scanning period is discarded. Therefore, the PAL system carrier chrominance signal can be converted into the NTSC system carrier chrominance signal.

The PAL system color burst signal alternately has a phase shift of plus and minus forty-five degrees every 1H, with respect to the same reference phase as the phase of the NTSC system color burst signal, and the above phase shift corresponds to non-inversion and inversion of the phase of the (R−Y) signal. In order to satisfy the above condition (5) by correcting the above PAL system color burst signal into the NTSC system color burst signal, the reference phase must always be fixed.

In the apparatus according to the present invention, focus was made on the point that there is a characteristic in that a reference phase of zero degree is obtained when color burst signals having phases of plus forty-five and minus forty-five degrees are composed. Accordingly, in the present invention, a reference color burst signal is obtained by composing adjacent color burst signals of 2H. The above reference color burst signal can be obtained by the combined usage of a 1H delay circuit used for correcting the carrier chrominance signal within the interval from which the above color burst signal interval is eliminated. That is, in the NTSC system VTR, a comb filter 74 consisting of a 1H delay circuit 75 and an adder 76 as shown in FIG. 3 is used to eliminate the cross talk interference of the carrier chrominance signal from adjacent tracks. Moreover, the gate circuit 73 is provided at a stage immediately before the above comb filter 74, and a gate pulse is applied to the gate circuit 73 from the gate pulse generator 72 through a changeover switch S5. Hence, only the carrier chrominance signal within the horizontal scanning period in which the (R−Y) signal is reversed, is interrupted.

Figure 4:
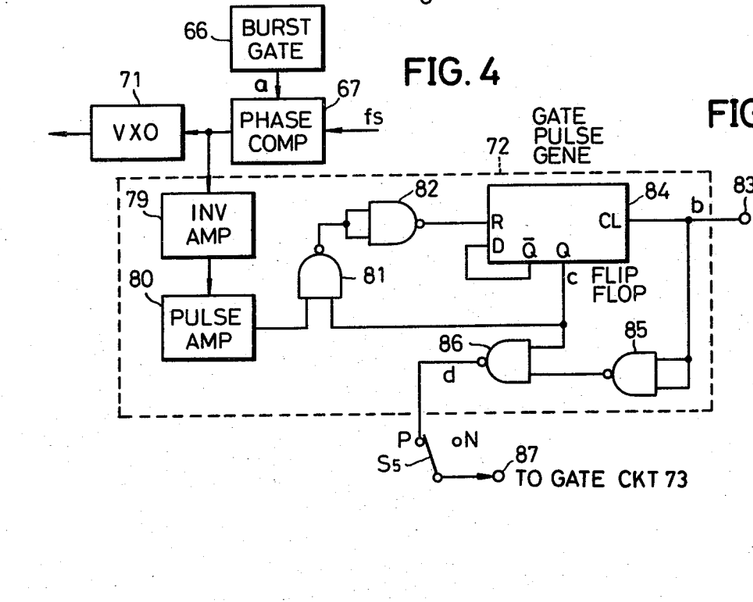
FIG. 4 is a systematic circuit diagram showing an embodiment of a gate pulse generator shown in FIG. 3.

Next, description will be given in more detail with respect to the above circuit part including the gate pulse generator 72. The gate pulse generator 72 has a construction shown in FIG. 4. As described above, the chrominance sub-carrier frequency of the carrier chrominance signal of the PAL system is set to 3.58 MHz. A color burst signal a shown in FIG. 5(A) which is separated and obtained from the burst gate circuit 66 is supplied to the phase comparator 67. The output error voltage of the phase comparator 67 becomes of positive polarity, for example, when the output error voltage is plus forty-five degrees with respect to the phase of the reproduced color burst signal as shown in FIG. 6(A), and becomes of negative polarity when the output error voltage is minus forty-five degrees with respect to the phase of the reproduced color burst signal. The above output error voltage is inverted and amplified at an inverting amplifier 79 shown in FIG. 4 to a signal having a waveform shown in FIG. 6(B), and then amplified at a pulse amplifier 80 shown in FIG. 4. Accordingly, an output pulse of the pulse amplifier 80 having a waveform shown in FIG. 6(C) is applied to one input terminal of a NAND-circuit 81.

Figure 5:
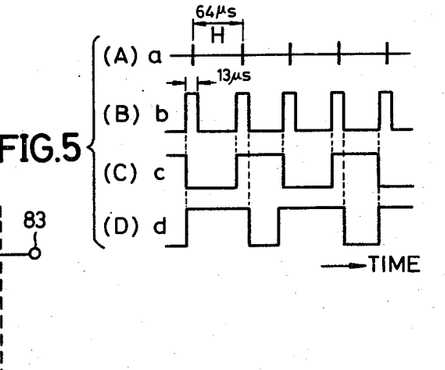
FIGS. 5(A) through 5(D) are diagrams respectively showing signal waveforms for explaining the operation of the gate pulse generator shown in FIG. 4.
Figure 6:
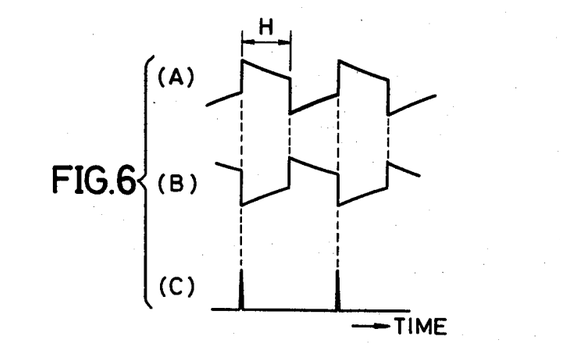
FIGS. 6(A) through 6(C) are diagrams respectively showing signal waveforms for explaining the operation of the gate pulse generator shown in FIG. 4.

In addition, a signal shown in FIG. 5(B) applied to an input terminal 83 whose horizontal scanning frequency $f_H$ coincides with that of the NTSC system, and whose positive polarity period coincides with the reproduced color burst signal part, is supplied to a clock input terminal CL of a delay-type (D-type) flip-flop 84, wherein the frequency of the signal thus supplied is frequency divided into one-half the original frequency. Hence, a square wave c shown in FIG. 5(C) is obtained from an output terminal Q of the above D-type flip-flop 84, and this square wave c is applied to the other input terminal of the NAND-circuit 81. The output of the NAND-circuit 81 is applied to a reset input terminal of the flip-flop 84 through an inverter 82. Accordingly, as shown in FIG. 5(C), the output square wave c of the flip-flop 84 is reset and inverted during the positive polarity period of the above described error voltage shown in FIG. 6(A) which is obtained as a result of the phase comparison.

Since the signal-to-noise (S/N) ratio of the error voltage obtained as a result of the phase comparison is low, it is difficult to form the error voltage directly into a square wave. However, by using the error voltage as a rest pulse as described above, a stable square wave c can be obtained. The above square wave c is supplied to a NAND-circuit 86 as a discriminating signal, together with the signal of the horizontal scanning frequency from the input terminal 83 which is passed through an inverter 85. Therefore, a non-symmetrical square wave d shown in FIG. 5(D) is obtained from the NAND-circuit 86. The non-symmetrical square wave d includes two color burst signal intervals within the positive polarity period. Hence, the non-symmetrical square wave d of the NAND-circuit 86 is supplied to the gate circuit 73 as a gate pulse, through the changeover switch S5.

Figure 7:
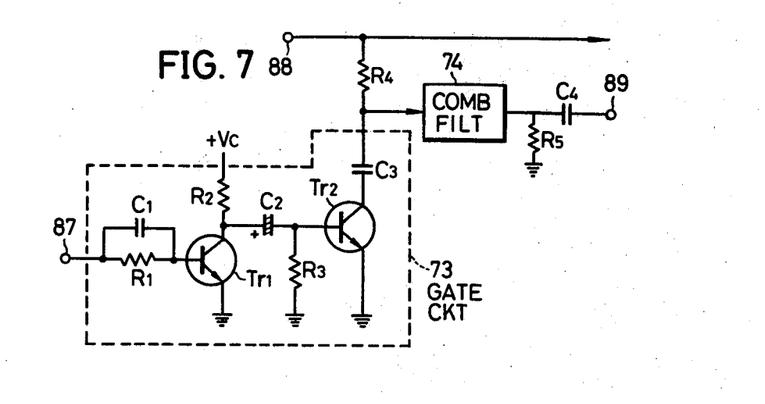
FIG. 7 is a circuit diagram showing an embodiment of a gate circuit shown in FIG. 3.

The gate circuit 73 has a construction shown in FIG. 7. The gate pulse shown in FIGS. 8(B) and 5(D) supplied to an input terminal 87, is applied to the base of a switching NPN-transistor $T_{r1}$ through a parallel circuit consisting of a resistor R1 and a speed-up capacitor C1. Accordingly, the transistor $T_{r1}$ is turned ON only during the positive polarity period. A signal obtained from a connection point between the collector of the transistor $T_{r1}$ and a load resistor R2, is applied to the base of a switching NPN-transistor $T_{r2}$ through an integration circuit consisting of a capacitor C2 and a resistor R3, to switch the transistor $T_{r2}$. The collector of the above transistor $T_{r2}$ is connected to an input terminal 88 through a capacitor C3 and a resistor R4 connected in series.

Figure 8:
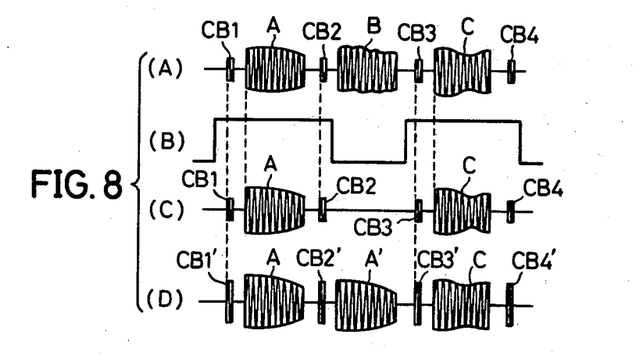
FIGS. 8(A) through 8(D) are diagrams respectively showing signal waveforms for explaining the operation of the gate circuit shown in FIG. 7.

As an example of the constant values for the circuit elements which construct the above gate circuit 73, the resistances of the resistors R1, R2, and R3 respectively are 33 kΩ, 3.9 kΩ, 10 kΩ, and the capacitances of the capacitors C1, C2, and C3 respectively are 0.0027 μF, 1 μF, and 0.0039 μF. In the gate circuit 73, the transistor $T_{r1}$ is turned ON and the transistor $T_{r2}$ is turned OFF during the positive polarity period of the gate pulse supplied to the input terminal 87, which is shown in FIG. 8(B) (same as that shown in FIG. 5(D)). Accordingly, a reproduced carrier chrominance signal of the PAL system whose chrominance sub-carrier frequency is set to 3.58 MHz and a color burst signal (shown in FIG. 8(A)) respectively supplied to the input terminal 88, are supplied to the comb filter 74 through a resistor R4. On the other hand, the transistor $T_{r2}$ of the gate circuit 73 is turned ON during the negative polarity period of the gate pulse since the transistor $T_{r1}$ is turned OFF and the collector voltage of the transistor $T_{r1}$ becomes $+V_c$. Hence, one terminal of the resistor R4 is grounded in an alternating-current manner through the capacitor C3 and the collector and emitter of the transistor $T_{r2}$. Therefore, the transmission of the reproduced carrier chrominance signal of the PAL system is interrupted from being supplied from the input terminal 88 to the comb filter 74 through the resistor R4.

The above signal supplied to the input terminal 88 is a time series composite signal consisting of the color burst signal indicated by CB1 through CB4 in FIG. 8(A) and the carrier chrominance signal during the video signal period indicated by A through C in FIG. 8(A). The phase relationship between the above signal supplied to the input terminal 88 and the gate pulse supplied to the input terminal 87, is of the relationship shown in FIGS. 8(A) and 8(B). Hence, the above signal is converted into a composite signal of the carrier chrominance signal and the color burst signal having a waveform shown in FIG. 8(C), and applied to the comb filter 74. That is, a carrier chrominance signal B within he period in which the (R−Y) signal is reversed is discarded, while on the other hand, the color burst signals CB1 through CB4 are always passed through the gate circuit 73.

Accordingly, the output signal of the comb filter 74 becomes of a waveform shown in FIG. 8(D). The output signal of the comb filter 74 is a time series composite signal in which color burst signals CB1' through CB4' (having a frequency of 3.58 MHz) mixed with a color burst signal of 1H before that particular point in time so that the phase coincides with the reference phase, the carrier chrominance signals A and C, and a signal A' obtained by delaying the signal A by 1H, are respectively inserted into the period in which the signal B is discarded. The carrier chrominance signal and the color burst signal in the above time series composite signal thus obtained, are similar to the carrier chrominance signal and the color burst signal of the NTSC system. Thus, the reproduced carrier chrominance signal and the color burst signal of the PAL system are converted into a carrier chrominance signal and a color burst signal of the NTSC system, and produced from an output terminal 89 after passing through a circuit comprising a resistor R5 and a capacitor C4 shown in FIG. 7. However, in the above described case, the level of the color burst signal is higher than the level of the normal color burst signal by 3 dB. Hence, the color burst signal of the output signal produced from the output terminal 89 is supplied to a burst level correction circuit 77 shown in FIG. 3 wherein the signal is attenuated and corrected by 3 dB. Moreover, the burst level correction circuit 77 performs the level correcting operation on the above color burst signal only during the period in which a switchover switch S6 is connected to the side of a contact point P. When the magnetic tape recorded with the color video signal of the NTSC system is reproduced, the changeover switch S6 is connected to the side of a contact point N, and the level of the input signal is not corrected to be produced as it is.

Therefore, the carrier chrominance signal and the color burst signal within the PAL system color video signal recorded by the PAL system VTR, and the carrier chrominance signal and the color burst signal obtained by converting the carrier chrominance signal and the color burst signal into signals similar to those of the NTSC system, are respectively obtained by the burst level correction circuit 77 and produced through an output terminal 78.

Hence, in a case where the reproduced carrier chrominance signal and the color burst signal are multiplexed with the reproduced luminance signal and converted into a predetermined frequency band before supplying the signal to the NTSC system color television receiver, the color can be reproduced in a normal manner. Since the field frequency of the NTSC system color video signal is 60 Hz, there is a frequency difference between a case where the magnetic tape recorded with the PAL system color video signal is reproduced as an artificial NTSC system color video signal because the field frequency in this case is 50 Hz. Accordingly, instability is introduced in the vertical synchronization of the NTSC system color television receiver, however, this instability can be corrected by manipulating a vertical synchronization knob of the television receiver. Furthermore, instability is hardly introduced in the horizontal synchronization since the horizontal synchronizing signal frequency is almost the same for the NTSC system and the PAL system.

In the apparatus according to the present invention, the cross talk interference is not positively eliminated. However, due to the operation of the phase rotation performed upon recording, the cross talk interference is not introduced as beat interference, and is only introduced as horizontal lines on the picture screen. The above horizontal lines introduced in the picture screen is not annoying visually, and is not a problem from the practical point of view. Moreover, the tracking ability is high, and the problem regarding the cross talk interference is not at all introduced in a case where the widths of the reproducing heads are narrow with respect to the track pitch. This can be achieved by using heads respectively having widths which are wide and narrow, for example.

The 1H delay circuit 75 within the comb filter 74 of the apparatus according to the present invention is used for delaying a signal by 1H period of the NTSC system color video signal, and is shorter than the 1H period of the PAL system color video signal by approximately 0.44 micro-seconds. In order to correct the above difference between the 1H periods of the two systems and use the NTSC system 1H delay circuit 75 in common for the two systems, the reference signal frequency of the servo system is not set to 24.99 Hz, but to 25.17 Hz upon reproduction of the magnetic tape recorded with the PAL system color video signal so that the frequency becomes equal to that upon horizontal scanning period of the NTSC system color video signal. That is, the frequency dividing ratio of the count down circuit 16 shown in FIG. 1 is set to 1/1,301.

On the other hand, as another method, the above difference of 0.44 micro-seconds can be obtained by alternately advancing and delaying the luminance signal within the color video signal by 0.22 micro-seconds every 1H, to obtain the 0.44 micro-seconds every 2H. By use of this method, no problem is introduced from the practical point of view, and the above method can be realized by advancing the luminance signal by 0.22 micro-seconds than during reproduction of the NTSC system color video signal.

Figure 3:
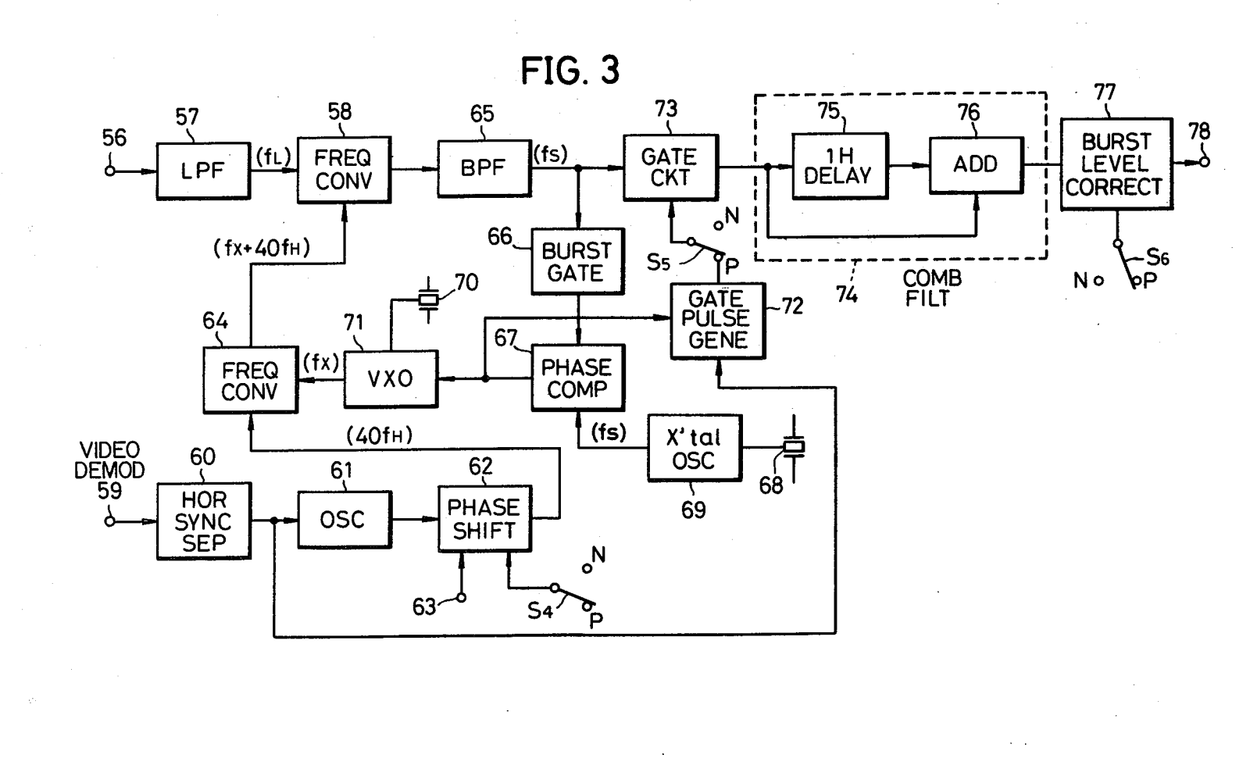
FIG. 3 is a systematic block diagram showing an embodiment of a processing system for the color chrominance signal and a color burst signal, in the apparatus according to the present invention.

Moreover, in FIG. 3, when reproducing the magnetic tape recorded with the NTSC system color video signal, the changeover switches S4 through S6 are respectively connected to the side of the contact points N.

In addition, the above description was given with respect to a VTR, however, the apparatus according to the present invention is not limited to the above example. The apparatus according to the present invention can be applied in a video transmitting apparatus of a form in which the frequencies of the carrier chrominance signal and the color burst signal are converted into low frequencies.

Further, this invention is not limited to these embodiments but various variations and modifications may be made without departing from the scope of the invention.

What is claimed is:

1. An apparatus for reproducing a color video signal from a recording medium which has a color video signal recorded in the characteristics of either a PAL system color video signal or an NTSC system color video signal, one of said signals comprising a frequency-modulated luminance signal and a frequency-converted carrier chrominance signal, a chrominance subcarrier frequency which has been converted from an original chrominance subcarrier frequency of its corresponding system into a frequency which is lower than a frequency band of the frequency-modulated luminance signal, said apparatus comprising:

reproducing means for picking up and reproducing the recorded signal from the recording medium;

means responsive to said picked up signal, for detecting whether the picked up signal has the characteristics of the PAL system color video signal or of the NTSC system color video signal;

separating means responsive to said picked up signal for individually separating the frequency-modulated luminance signal and the frequency-converted carrier chrominance signal from the output signal of said reproducing means;

demodulating means responsive to said separating means for demodulating the separated frequency-modulated luminance signal to reproduce a luminance signal of its corresponding system;

frequency converting means for frequency-reconverting the chrominance subcarrier frequency of the separated frequency-converted carrier chrominance signal into a predetermined frequency which is substantially equal to a nominal chrominance subcarrier frequency of the NTSC system color video signal;

means for combining output signals of said demodulating means and said frequency converting means;

gating means coupled to the output side of said frequency converting means for passing the frequency-reconverted carrier chrominance signal including color burst signals within horizontal scanning periods in which a component R−Y of the frequency-reconverted carrier chrominance signal is not subjected to a PAL inversion and for blocking the frequency-reconverted carrier chrominance signal excluding a frequency-reconverted color burst signal within horizontal scanning periods in which the component R−Y of the frequency-reconverted carrier chrominance signal is subjected to the PAL inversion when the PAL system color video signal is recorded on said recording medium which is being reproduced, and for passing the output signal of said frequency converting means when the NTSC system color video signal is recorded on said recording medium which is being reproduced;

delaying means coupled to said gating means for delaying an output signal of said gating means by an interval corresponding to one horizontal scanning period; and adding means for adding output signals of said gating means and said delaying means, and for producing an output signal including a carrier chrominance signal and a color burst signal.

2. An apparatus as claimed in claim 1 which further comprises a burst level correcting circuit responsive to the output signal produced by said adding means for attenuating the level of the color burst signal included in said output signal of said adding means, said attenuation being by 3 dB when the color video signal is recorded in the characteristics of the PAL system on said recording medium which is being reproduced.

3. An apparatus as claimed in claim 1 which further comprises a separating circuit for separating a horizontal synchronizing signal from the luminance signal in which apparatus said frequency converting means comprises oscillator means for oscillating at said predetermined frequency, said gating means having a gate circuit and a gate pulse generator for controlling the gating operation of said gate circuit, and said gate pulse generator having an inverting amplifier for inverting and amplifying a phase error voltage obtained by comparing phases of an output signal of said oscillator means and a reproduced color burst signal obtained from said frequency converting means, a first NAND-circuit responsive to an output voltage of said inverting amplifier to one input terminal thereof, a flip-flop reset by an output signal of said first NAND-circuit and having a pulse which is synchronized responsive to the separated horizontal synchronizing signal supplied thereto as an input clock pulse, said flip-flop applying an output signal to another input terminal of first NAND-circuit, and a second NAND-circuit supplied with an output signal of said flip-flop and said input clock pulse, for producing a non-symmetrical square wave gate pulse including two reproduced color burst signals intervals within a positive or negative polarity period.

* * * * *